(12) United States Patent
Kitaura et al.

(10) Patent No.: US 8,133,655 B2
(45) Date of Patent: *Mar. 13, 2012

(54) OPTICAL INFORMATION RECORDING MEDIUM, METHOD AND APPARATUS FOR RECORDING AND REPRODUCING FOR THE SAME

(75) Inventors: Hideki Kitaura, Kyoto (JP); Yukako Doi, Osaka (JP); Shigeru Furumiya, Hyogo (JP); Kenichi Nishiuchi, Osaka (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 951 days.

This patent is subject to a terminal disclaimer.

(21) Appl. No.: 11/865,902

(22) Filed: Oct. 2, 2007

(65) Prior Publication Data

US 2008/0080352 A1  Apr. 3, 2008

(30) Foreign Application Priority Data

Oct. 2, 2006 (JP) ................................. 2006-270383

(51) Int. Cl.
*G11B 7/24* (2006.01)
(52) U.S. Cl. ................. 430/270.13; 430/945; 428/64.5; 369/288; 369/275.2
(58) Field of Classification Search .......................... None
See application file for complete search history.

(56) References Cited

U.S. PATENT DOCUMENTS

| | | | |
|---|---|---|---|
| 4,624,914 A | 11/1986 | Kimura et al. | |
| 6,229,785 B1 | 5/2001 | Kitaura et al. | |
| 6,881,466 B2 * | 4/2005 | Kojima et al. | 428/64.1 |
| 2004/0222479 A1 * | 11/2004 | Uno et al. | 257/432 |
| 2006/0078706 A1 * | 4/2006 | Yoshitoku et al. | 428/64.4 |
| 2009/0323495 A1 * | 12/2009 | Kitaura et al. | 369/100 |

FOREIGN PATENT DOCUMENTS

| | | | |
|---|---|---|---|
| JP | 50-46317 | | 4/1975 |
| JP | 60-203490 | | 10/1985 |
| JP | 60-236133 | * | 11/1985 |
| JP | 61-68296 | | 4/1986 |
| JP | 61-141591 | | 6/1986 |
| JP | 61-190734 | * | 8/1986 |
| JP | 62-88152 | | 4/1987 |
| JP | 63-023235 | * | 1/1988 |
| JP | 2002-251778 | | 9/2002 |
| JP | 2002-298436 | * | 10/2002 |
| WO | WO98/09823 | | 3/1998 |
| WO | 2007/063800 | * | 6/2007 |

* cited by examiner

*Primary Examiner* — Martin Angebranndt
(74) *Attorney, Agent, or Firm* — Hamre, Schumann, Mueller & Larson, P.C.

(57) ABSTRACT

In an optical information recording medium of the present invention, at least one information layer provided on a transparent substrate includes a protective layer and a write-once recording layer that are disposed in this order from the transparent substrate side. The recording layer contains at least one selected from Cr—O, Zn—O, Ga—O, In—O, Sn—O, Sb—O, Bi—O, and Te—O. The protective layer contains at least one selected from Cr—O, Zn—O, Ga—O, In—O, Sn—O, Sb—O, Bi—O, and Te—O. When the total amount of all the atoms other than oxygen atoms contained in the protective layer is taken as 100 atom %, the total amount of atoms of Cr, Zn, Ga, In, Sn, Sb, Bi, and Te in the protective layer is at least 70 atom %.

12 Claims, 4 Drawing Sheets

OPTICAL INFORMATION RECORDING MEDIUM, METHOD AND APPARATUS FOR RECORDING AND REPRODUCING FOR THE SAME

BACKGROUND OF THE INVENTION

1. Field of the Invention

The present invention relates to an optical information recording medium that allows information signals with high signal quality to be recorded or reproduced by irradiating a thin film formed on a substrate with a high energy optical beam such as a laser beam. The present invention also relates to a recording and reproducing method as well as a recording and reproducing apparatus.

2. Related Background Art

Research and development is being carried out actively about a recording medium that allows information signals to be recorded or reproduced by irradiating a thin film formed on a transparent substrate with a laser beam narrowed down to a minute spot. A known write-once recording medium is one in which, for example, a TeOx (0<x<2) recording thin film is formed, on a substrate, of a mixture of Te and $TeO_2$, which is a material containing, for instance, a metal element dispersed in an oxide that serves as a base material (see, for example, JP 50(1975)-46317 A). A large reflectance change can be obtained from this recording medium through irradiation with an optical beam for reproduction.

The TeOx recording thin film allows a crystalline recording mark to be formed by being irradiated with a laser beam in the amorphous state after being formed without being subjected to an initialization process, such as laser annealing. This is an irreversible process and does not allow the overwrite correction or erasure to be performed. Therefore the medium including this recording thin film can be used as a recording medium capable only of writing once. In the TeOx recording thin film, it takes some time until a signal is saturated after being recorded, i.e. until crystallization in the recording thin film caused by laser beam irradiation proceeds sufficiently. Accordingly, unless the medium including this recording thin film is improved, it is not suitable as a medium that requires high-speed response as in the case of, for example, a computer data file in which data is recorded on a disk and is verified after one rotation. In order to accommodate this disadvantage, it has been proposed to add, for example, Pd or Au as a third element to TeOx (for example, see JP 60(1985)-203490 A, JP 61(1986)-68296 A, and JP 62(1987)-88152 A). Pd and Au are considered to have the function of promoting crystal growth of Te in a TeOx recording thin film at the time of laser beam irradiation. Therefore crystal grains of Te and a Te—Pd alloy or a Te—Au alloy grow at high speed. Pd and Au have a high oxidation resistance and do not impair the high moisture resistance of the TeOx recording thin film.

Generally, the following method is used as a basic measure for increasing the amount of information that one medium can handle. That is, the wavelength of the laser beam is shortened or the numerical aperture of an objective lens for focusing a laser beam is increased, so that the spot diameter of the laser beam is reduced to improve the areal recording density. Furthermore, recently, a medium with a multilayer structure including a plurality of information layers stacked together also has been put into practical use. In order to achieve such high-density recording and multilayer recording, a recording medium also has been proposed that is obtained by improving the film thickness and composition of a recording material containing TeOx and, for example, Pd or Au added thereto (see, for example, WO 98/09823 (pp 20-23, FIG. 4)). Moreover, the recording density is increased through an optical enhancement effect and an effect of suppressing the thermal interference between marks by cooling (see, for example, JP 2002-251778 A). These effects are obtained by addition of a reflective layer.

When the high density recording as described above is performed, especially recording using a blue-violet laser, a recording layer (recording thin film) may not be suitable for high density recording. This is because a recording layer may be damaged due to the heat load imposed by laser heating in some cases, which may cause, for instance, an increase in noise, and thereby the quality of a recording signal may deteriorate. In order to prevent this, it is effective to provide a protective layer produced with a material such as a dielectric. Examples of the properties required of the protective layer include (1) a high heat resistance and protecting a recording layer from thermal damage, (2) a high adhesiveness with an adjoining material such as a recording layer and undergoing, for example, no separation, corrosion, and diffusion even under conditions of a high temperature and humidity, (3) a high transparency and a suitable refractive index, and enhancing the optical change of a recording layer, and (4) being thermally stable and preventing the grain size and composition distribution from changing even at a high temperature and humidity. Particularly in a write-once recording medium, although it is important for it to allow high density recording to be performed, it is very important for it to have a high storage reliability. Even if sufficiently high signal quality was obtained at the time of recording, the effect of thermal damage that was not manifest immediately after recording may become evident later on and causes an increase in noise when the recording medium is left, for example, under a high temperature or humidity environment.

In order to prevent the quality of a recording signal from deteriorating due to, for example, an increase in noise, which results from the damage of a recording layer caused due to the heat load imposed by laser heating as described above, it also is effective to provide a layer with a high radiation performance, such as metal, as a means other than providing the protective layer produced with a material such as a dielectric. Generally, the above-mentioned layer is formed using a material with a suitable optical constant to be allowed to have a reflection function, that is, the layer is formed to serve as a reflective layer, and thereby the optical interference effect is used to increase the optical absorptance of a recording layer to improve the recording sensitivity and further to enhance the optical change of the recording layer. The reflective layer also is required to have high heat resistance, adhesiveness with an adjoining layer, and further high reliability under conditions of high temperature and humidity.

SUMMARY OF THE INVENTION

The present invention is intended to provide an optical information recording medium with a high storage reliability that allows high signal quality to be obtained in high density recording. The present invention also is intended to provide a method and an apparatus for recording and reproducing with respect to such an optical information recording medium.

In an optical information recording medium of the present invention, at least one information layer provided on a transparent substrate includes a protective layer and a write-once recording layer that are disposed in this order from the transparent substrate side. The recording layer contains at least one selected from Cr—O, Zn—O, Ga—O, In—O, Sn—O, Sb—O, Bi—O, and Te—O. The protective layer contains at least one selected from Cr—O, Zn—O, Ga—O, In—O, Sn—O, Sb—O, Bi—O, and Te—O. When the total amount of all atoms other than an oxygen atom contained in the protective layer is taken as 100 atom %, the total amount of atoms of Cr, Zn, Ga, In, Sn, Sb, Bi, and Te in the protective layer is at least 70 atom %.

A method of recording and reproducing with respect to an optical information recording medium according to the present invention is a method in which the above-mentioned optical information recording medium of the present invention is irradiated with an optical beam having a wavelength of 450 nm or shorter and thereby information is recorded thereon or reproduced therefrom.

An apparatus for recording and reproducing with respect to an optical information recording medium according to the present invention includes at least a recording and reproducing unit in which the above-mentioned optical information recording medium of the present invention is irradiated with an optical beam having a wavelength of 450 nm or shorter and thereby information is recorded thereon or reproduced therefrom, and a detection unit that detects light reflected from the optical information recording medium.

The present invention makes it possible to provide an optical information recording medium with a high storage reliability that allows high signal quality to be obtained in high density recording, and a method and an apparatus for recording and reproducing with respect to the optical information recording medium.

DETAILED DESCRIPTION OF THE INVENTION

In the optical information recording medium of the present invention, at least one information layer is provided on a transparent substrate. This information layer includes a protective layer and a write-once recording layer. In this information layer, the protective layer and the recording layer are disposed in this order from the transparent substrate side. The optical information recording medium of the present invention is configured so that an optical beam such as a laser beam is incident from the transparent substrate side. The recording layer contains at least one selected from Cr—O, Zn—O, Ga—O, In—O, Sn—O, Sb—O, Bi—O, and Te—O. The protective layer contains at least one selected from Cr—O, Zn—O, Ga—O, In—O, Sn—O, Sb—O, Bi—O, and Te—O. When the total amount of all the atoms other than oxygen atoms contained in the protective layer is taken as 100 atom %, the total amount of atoms of Cr, Zn, Ga, In, Sn, Sb, Bi, and Te in a protective layer is at least 70 atom %.

In this specification, the material expressed as "element-O" is a material containing the element and oxygen (O) as its components, and embraces, for example, a compound containing the element and oxygen (O), an oxide of the element, and an oxygen-deficient oxide of the element.

Hereinafter, embodiments of the present invention are described in detail with reference to the drawings. The following descriptions are examples of the present invention and the present invention is not limited thereby.

EMBODIMENT 1

Figure 1:
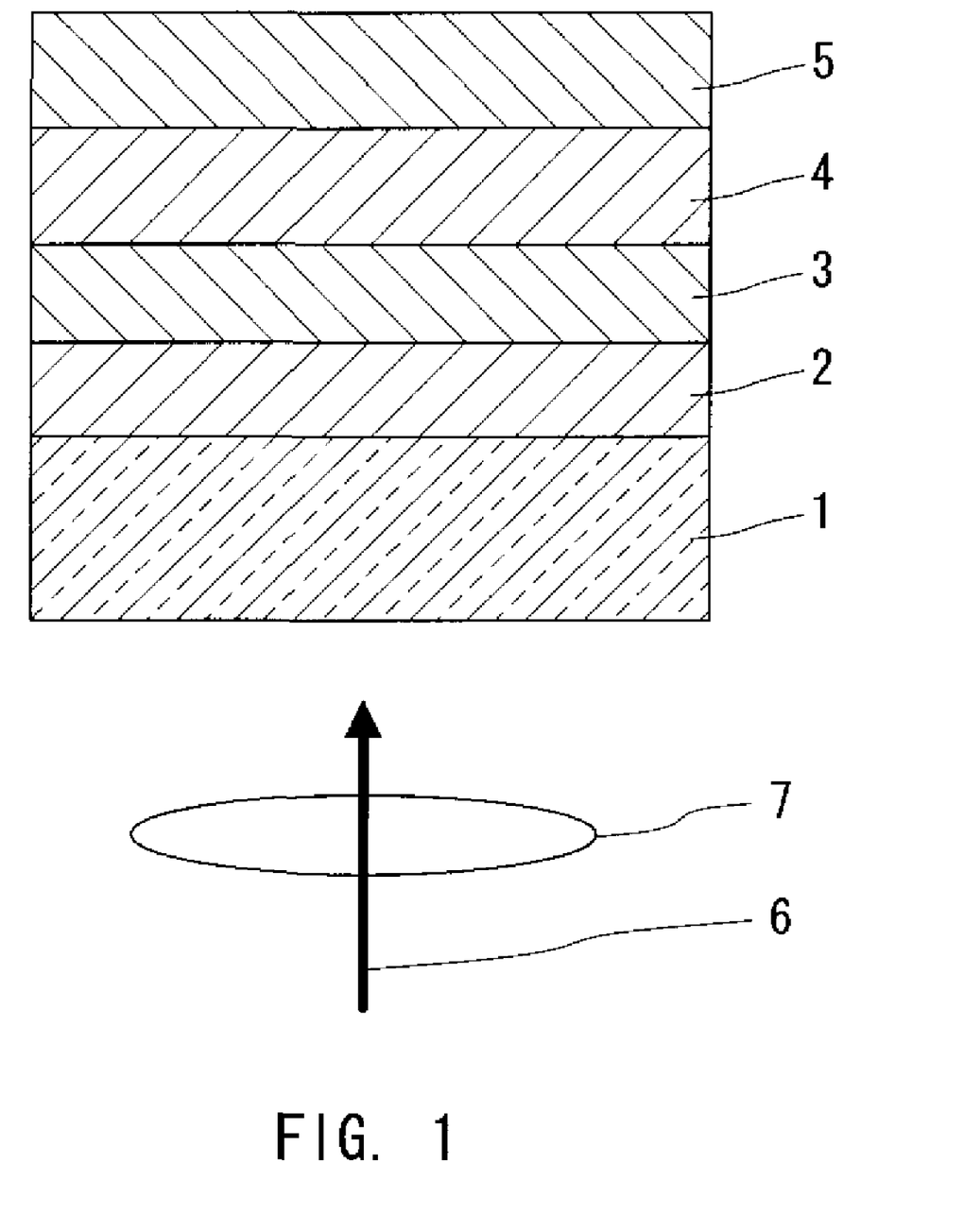
FIG. 1 is a cross-sectional view showing a structural example of the optical information recording medium according to the present invention.
Figure 2:
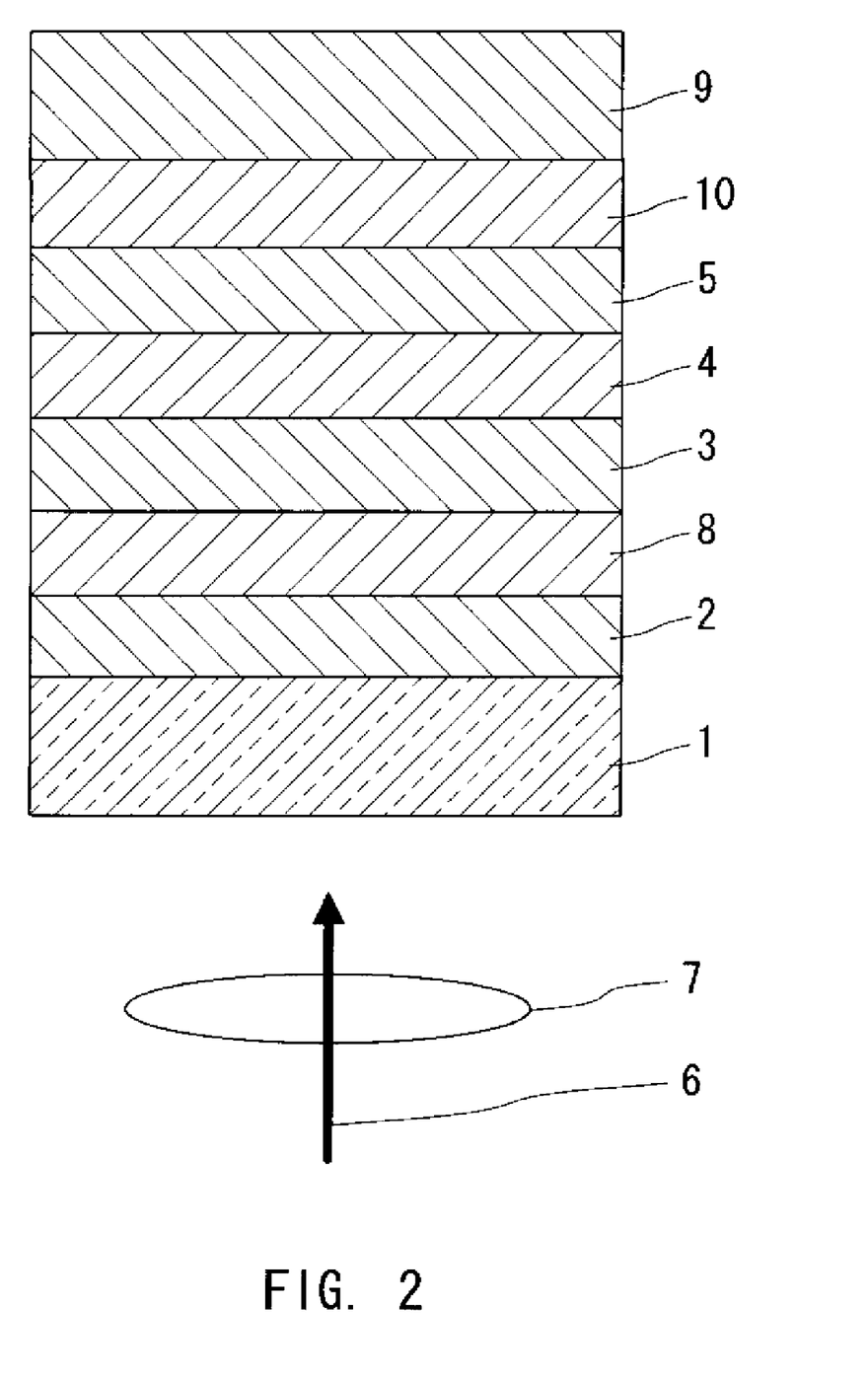
FIG. 2 is a cross-sectional view showing another structural example of the optical information recording medium according to the present invention.
Figure 3:
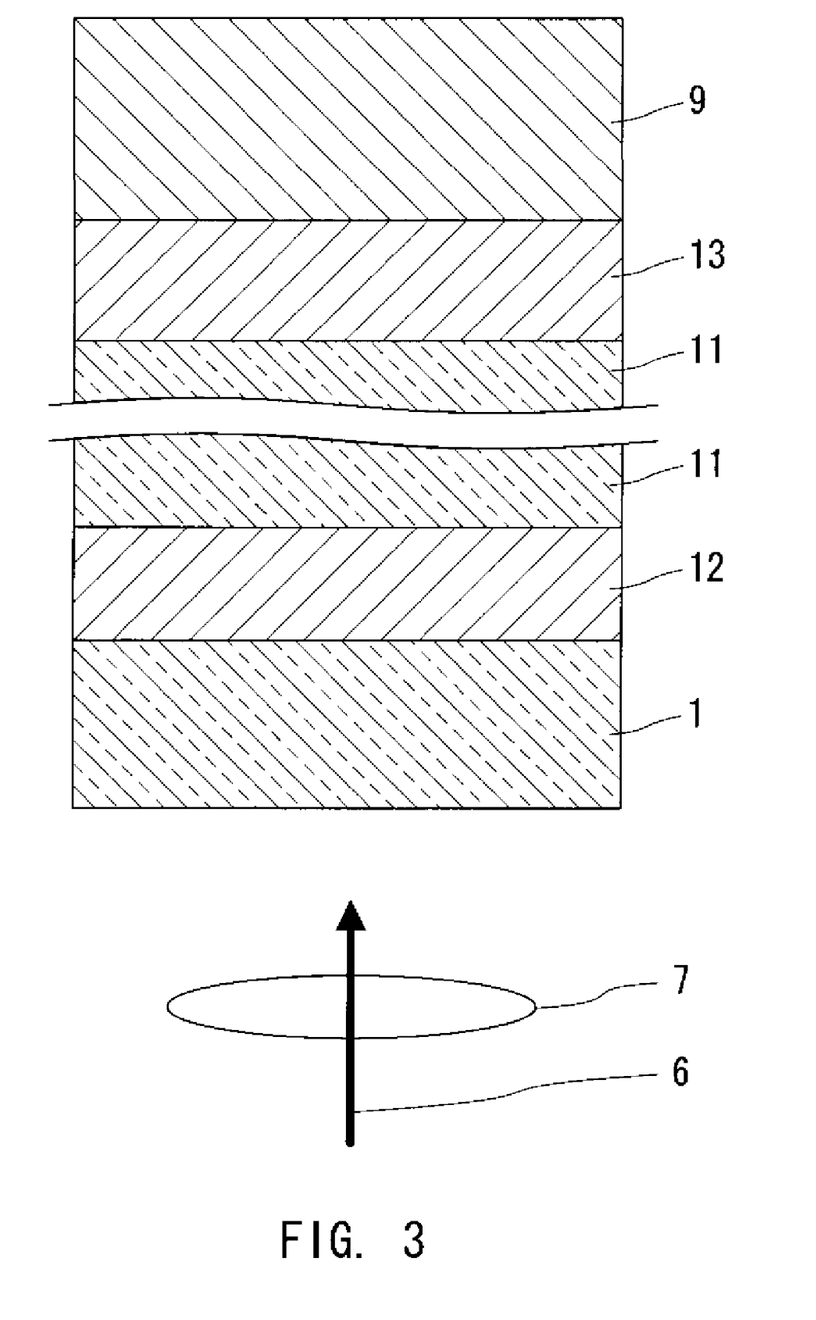
FIG. 3 is a cross-sectional view showing still another structural example of the optical information recording medium according to the present invention.

FIGS. 1 to 3 are partial cross-sectional views of respective structural examples of the optical information recording medium according to the present invention. The components having the same functions are indicated with identical numerals, and descriptions thereof may be omitted in some cases.

In the optical information recording medium shown in FIG. 1, at least a protective layer 2, a recording layer 3, an interlayer 4, and a reflective layer 5 are disposed in this order on a transparent substrate 1. In this example, an information layer is composed of the protective layer 2, the recording layer 3, the interlayer 4, and the reflective layer 5 that are disposed sequentially from the transparent substrate 1 side. However, the information layer may be composed only of the protective layer 2 and the recording layer 3. With respect to the interlayer 4 and the reflective layer 5 that are disposed on the side opposite to the protective layer 2 with respect to the recording layer 3, both of them may be provided or only either one of them may be provided. This optical information recording medium is irradiated with a laser beam 6 focused with an objective lens 7 from the transparent substrate 1 side and thereby information is recorded thereon or reproduced therefrom.

It also is possible to provide a buffer layer 8 between the protective layer 2 and the recording layer 3, a protective substrate 9 on the opposite side to the interlayer 4 with respect to the reflective layer 5, and an upper protective layer 10 between the reflective layer 5 and the protective substrate 9 as in the optical information recording medium shown in FIG. 2. The buffer layer 8, the protective substrate 9, and the upper protective layer 10 each can be provided as required.

Like the optical information recording medium shown in FIG. 3, n information layers including a first information layer 12 to an n-th information layer 13 (where n denotes an integer of at least 2) each may be provided between a transparent substrate 1 and a protective substrate 9 via a separation layer 11. In this case, at least one of the n information layers has the same film structure (a multilayer thin film structure) as that of the information layer shown in FIG. 1 or FIG. 2 sequentially from the side near to the transparent substrate 1. With respect to each information layer of this optical information recording medium, a predetermined information layer is irradiated with a laser beam 6 focused with an objective lens 7 from the transparent substrate 1 side, and thereby information is recorded thereon or reproduced therefrom. When the optical information recording medium of the present invention includes n information layers, as long as at least one of the n information layers has a structure containing the protective layer 2 and the recording layer 3 that are disposed in this order from the transparent substrate 1 side (laser beam incident side) as described above, the structures of the other information layers are not limited. Therefore a rewritable information layer and a read-only information layer also can be used as the other information layers. In this case, information that is intended to be recorded once and not to be eliminated and information to be rewritten as well as read-only information can exist together in one medium. Thus a highly advantageous optical information recording medium that is suitable for various applications can be provided.

The recording layer 3 is formed of a write-once recording material and contains, as its base material, at least one selected from Cr—O, Zn—O, Ga—O, In—O, Sn—O, Sb—O, Bi—O, and Te—O. The recording layer 3 can contain any one or more elements selected from Te, Sb, Bi, Ge, Sn, Ga, In, Pd, Au, Pt, Ni, Ag, and Cu that is/are added to the above-mentioned base material for increasing temperature to cause crystallization at high speed and thereby cause an optical change. When using, for example, Te—O as a base material, one or more elements selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Tr, Pt, Au, and Bi can be added. Especially when using Te—O as a base material, at least either one selected from Pd and Au is suitable as an additive element.

Moreover, the recording layer 3 further may contain components (elements) other than the components described above for the purposes of, for example, adjustments of crystallization speed, thermal conductivity, or an optical constant, or improvement in heat resistance or moisture resistance. The other elements to be contained in the recording layer 3 include, for example, one or more elements selected from nonmetallic elements such as N, F, C, S, and B. These elements can be added suitably to the recording layer 3 according to need. In this case, when the total amount of all the atoms contained in the recording layer 3 is taken as 100 atom %, the total amount of atoms of the elements is preferably 20 atom % or lower and more preferably 10 atom % or lower.

The film thickness of the recording layer 3 is preferably 2 nm to 70 nm and more preferably 4 nm to 40 nm. When the film thickness of the recording layer 3 is thinner than the above-mentioned range, sufficiently high reflectance and sufficiently large change in reflectance may not be obtained, which may result in a lower C/N ratio. If the film thickness of the recording layer 3 is thicker than the above-mentioned range, since the thermal diffusion in the thin film plane of the recording layer 3 increases relatively, the outline of a recording mark may become unclear, which may result in a lower C/N ratio in high density recording.

The protective layer 2 contains at least one selected from Cr—O, Zn—O, Ga—O, In—O, Sn—O, Sb—O, Bi—O, and Te—O. The above-mentioned respective components contained in the protective layer 2 do not need to be compound compositions. It can be, for example, a composition in which oxygen (O) is defective. In order to improve the adhesiveness with the recording layer 3, a composition in which oxygen has been lost actively also can be used. When the total amount of all the atoms other than oxygen atoms contained in the protective layer 2 is taken as 100 atom %, the total amount of atoms of Cr, Zn, Ga, In, Sn, Sb, Bi, and Te in the protective layer 2 is at least 70 atom % (preferably at least 90 atom %, and more preferably 100 atom %). The protective layer 2 can contain material components other than those described above (for example, N, F, C, S, and B), as long as they do not impair the original functions thereof.

The protective layer 2 satisfies all the following conditions, which have been described above, in combination with the above-mentioned recording layer 3: (1) a high heat resistance and protecting the recording layer 3 from thermal damage, (2) a high adhesiveness with an adjoining material such as the recording layer 3 and undergoing, for example, no separation, corrosion, and diffusion even under conditions of a high temperature and humidity, (3) a high transparency and a suitable refractive index, and enhancing the optical change of the recording layer 3, and (4) being thermally stable and preventing the grain size and composition distribution from changing even at a high temperature and humidity.

Among the above-mentioned materials for the protective layer 2, Zn—O, Te—O, and Sn—O are used preferably. Therefore, it is preferable that the protective layer 2 contain at least one selected from Zn—O, Te—O, and Sn—O, and when the total amount of all the atoms other than oxygen atoms contained in the protective layer 2 is taken as 100 atom %, the total amount of atoms of Zn, Te, and Sn in the protective layer 2 be at least 30 atom %.

Furthermore, when a first component group consists of Zn—O, Te—O, and Sn—O and a second component group consists of Cr—O, Sb—O, Bi—O, In—O, and Ga—O, it is preferable that the protective layer 2 contain at least one selected from the first component group and at least one selected from the second component group. In this case, when the total amount of all the atoms other than oxygen atoms contained in the protective layer 2 is taken as 100 atom %, it is preferable that the total amount of atoms of Zn, Te, and Sn be 33 atom % to 96 atom % and the total amount of atoms of Cr, Sb, Bi, In, and Ga be 4 atom % to 67 atom %, in the protective layer 2. Particularly, it is further preferable that Zn—O be contained as one selected from the first component group and Cr—O be contained as one selected from the second component group. In this case, it is preferable that the amount of atoms of Zn be 33 atom % to 96 atom % and the amount of atoms of Cr be 4 atom % to 67 atom % (more preferably less than 50 atom % and further preferably less than 34 atom %).

The protective layer 2 also may contain sulfur (S) as a component. There is no particular problem in that the protective layer 2 containing S is allowed to adjoin the recording layer 3 since a high adhesiveness can be achieved thereby. However, it may cause, for example, separation, corrosion, and dispersion when the protective layer 2 containing S is allowed to adjoin a transparent substrate 1 made of a resin material. For this reason, when the total amount of all the atoms other than oxygen atoms contained in the protective layer 2 is taken as 100 atom %, it is desirable that the amount of atoms of S in the protective layer 2 be 2 atom % or lower.

It is not always necessary for the protective layer 2 to be in contact with the recording layer 3. In order to prevent, for example, separation from occurring due to film stress in both of the layers or inequality in expansion and contraction caused by heat or humidity, a buffer layer 8 (see FIG. 2) can be interposed if needed. For example, when the buffer layer 8 is provided that is formed using, for instance, one of various dielectric materials, specifically, for example, sulfide or carbide, adhesiveness further can be improved. For example, it is preferable that a buffer layer 8 formed using ZnS or a material containing, for example, SiO$_2$ mixed with ZnS used as a base be inserted between the protective layer 2 and the recording layer 3.

The materials that can be used for the reflective layer 5 include metal such as Ag, Au, Al, and Cu as well as an alloy containing such metal as a base. Particularly, an Ag alloy with a high reflectance is preferred. The element to be added to Ag is not particularly limited. Examples of suitable elements include Pd, Pt, Ni, Ru, Au, Cu, Zn, Al, Ga, In, Si, Ge, Sn, Sb, Bi, Ca, Mg, Y, Nd, Sm, Ti, Cr, O, N, F, C, S, and B, which are highly effective in a small amount for preventing aggregation and miniaturizing a grain size. Particularly, Pd, Cu, Bi, Nd, Y, and Ga are further effective, and one element or more of them can be used. In order to prevent the high thermal conductivity and reflectance of Ag from being impaired while such effects are allowed to be exhibited, the total amount of atoms of the elements to be added is preferably 0.01 atom % to 10 atom % and more preferably 0.05 atom % to 5 atom %, with respect to the whole reflective layer 5 (when the total amount of all the atoms contained in the reflective layer 5 is taken as 100 atom %).

Examples of the material that can be used for the interlayer 4 include oxides of, for example, Y, Ce, Ti, Zr, Nb, Ta, Co, Zn, Al, Si, Ge, Sn, Pb, Sb, Bi, and Te, nitrides of, for example, Ti, Zr, Nb, Ta, Cr, Mo, W, B, Al, Ga, In, Si, Ge, Sn, and Pb, carbides of, for example, Ti, Zr, Nb, Ta, Cr, Mo, W, and Si, sulfides, selenides, or tellurides of, for example, Zn and Cd, fluorides of rare earths such as Mg, Ca, and La, elemental substances such as C, Si, and Ge, and mixtures thereof. However, when the reflective layer 5 contains Ag or an Ag alloy, it is preferable that a material that is free from a sulfide be used because the use of a sulfide in the interlayer 4 can cause corrosion. For the interlayer 4, it also is possible to use the same material as that used for the protective layer 2. The thickness of the interlayer 4 is preferably 2 nm to 40 nm and more preferably 5 nm to 20 nm.

Examples of the material that can be used for the upper protective layer 10 include those described as the materials for the interlayer 4. However, the material for the upper protective layer 10 does not need to be identical to that used for the interlayer 4. For instance, when the reflective layer 5 contains Ag or an Ag alloy, it is preferred to use a material that is free from a sulfide. The upper protective layer 10 may be formed of the same material as that used for the protective layer 2 or the interlayer 4. The thickness of the upper protective layer 10 is preferably 2 nm to 80 nm and more preferably 5 nm to 50 nm.

Each thin film described above can be formed by a thin film vapor-phase deposition method such as a vacuum deposition method, a sputtering method, an ion plating method, a chemical vapor deposition (CVD) method, or a molecular beam epitaxy (MBE) method. The respective thin films described above can be examined for their materials and compositions by a method such as Auger electron spectroscopy, X-ray photoelectron spectroscopy, or secondary ion mass spectrometry (for instance, "Thin Film Fabrication Handbook" edited by the Japan Society of Applied Physics, Thin Film And Surface Physics Division, issued by Kyoritsu Shuppan Co., Ltd., 1991). In this embodiment, it was confirmed that the target material compositions of the respective layers were substantially equivalent to the compositions of the thin films that are formed actually. However, depending on, for example, the film forming apparatus, film forming conditions, or method of producing a target, the target material compositions may be different from the compositions of the thin films that are formed actually. In such cases, it is preferable that a correction coefficient for correcting the deviation in composition be determined from the empirical rule beforehand to decide the target material composition so that a thin film with a desired composition is obtained.

A laser beam is incident on the optical information recording medium of the present invention from the transparent substrate side. Therefore, the material for the transparent substrate 1 is preferably substantially transparent at the wavelength of the laser beam 6. Examples of the material that can be used for the transparent substrate 1 include polycarbonate resin, polymethylmethacrylate resin, polyolefin resin, norbornene resin, UV-curable resin, glass, and a suitable combination thereof. The thickness of the transparent substrate 1 is not particularly limited. A transparent substrate with a thickness of about 0.01 to 1.5 mm can be used. It is preferable that, for example, the thickness be about 0.3 to 0.8 mm and about 0.03 to 0.2 mm when the numerical aperture NA of an objective lens 5 is about 0.6 to 0.7 and about 0.8 to 0.9, respectively. When the transparent substrate 1 is thin, for example, 0.3 mm or thinner, the transparent substrate 1 can be produced by attaching each sheet-shaped resin described above on an information layer, or applying UV-curable resin onto an information layer by spin coating and curing it through ultraviolet irradiation.

The protective substrate 9 is a substrate disposed on the side opposite to the laser beam incident side in the medium. The same materials as those described above as the materials for the transparent substrate 1 can be used for the protective substrate 9. However, the material for the protective substrate 9 may be different from that used for the transparent substrate 1 and is not always necessary to be transparent at the wavelength of the laser beam 6. Furthermore, the thickness of the protective substrate 9 is not particularly limited, and one with a thickness of about 0.01 to 3.0 mm can be used.

For the separation layer 11, for example, UV-curable resin can be used. The thickness of the separation layer 11 needs to be at least equal to the focal depth determined from the numerical aperture NA of the objective lens 7 and the wavelength λ of the laser beam 6 so that the cross talk from other layers may be small when any one of the first information layer 12 to the n-th information layer 13 is reproduced. Furthermore, the thickness also needs to allow all the information layers to be in a range where an optical beam can be focused. For example, in the cases of λ=660 nm and NA=0.6 as well as λ=405 nm and NA=0.85, the thickness of the separation layer 11 at least needs to be 10 μm to 100 μm and 5 μm to 50 μm, respectively. However, if the optical system or technique that allows the cross talk between layers to be reduced is developed, there also is a possibility that the thickness of the separation layer 11 may be less than the range described above.

When two optical information recording media such as those shown in FIG. 2 or 3 are bonded together, with the respective protective substrate 9 sides thereof facing each other and thereby a double-sided structure is obtained, the amount of information that can be stored per medium further can be doubled.

When the optical information recording medium of this embodiment is to be produced, the respective thin films and separation layer 11 described above are formed sequentially on the transparent substrate 1 and then the protective substrate 9 may be formed thereon or attached thereto, or on the contrary, the respective thin films and separation layer 11 are formed sequentially on the protective substrate 9 and then the transparent substrate 1 may be formed thereon or attached thereto. Especially, the latter is suitable for the case where for example, the numerical aperture NA of the objective lens 7 is as large as at least 0.8, and the transparent substrate 1 is as thin as 0.2 mm or thinner. In that case, a groove for guiding the laser beam 6 and the concave-convex pattern such as address signals are formed at the surfaces of the protective substrate 9 and the separation layer 11, i.e. are formed by transfer from a tool with a desired concave-convex pattern pre-formed thereon, such as a stamper. In this process, when the layer thickness is particularly thin as in the case of the separation layer 11 and the injection method usually used is difficult to carry out, the photo-polymerization method (the 2P method) can be used.

Figure 4:
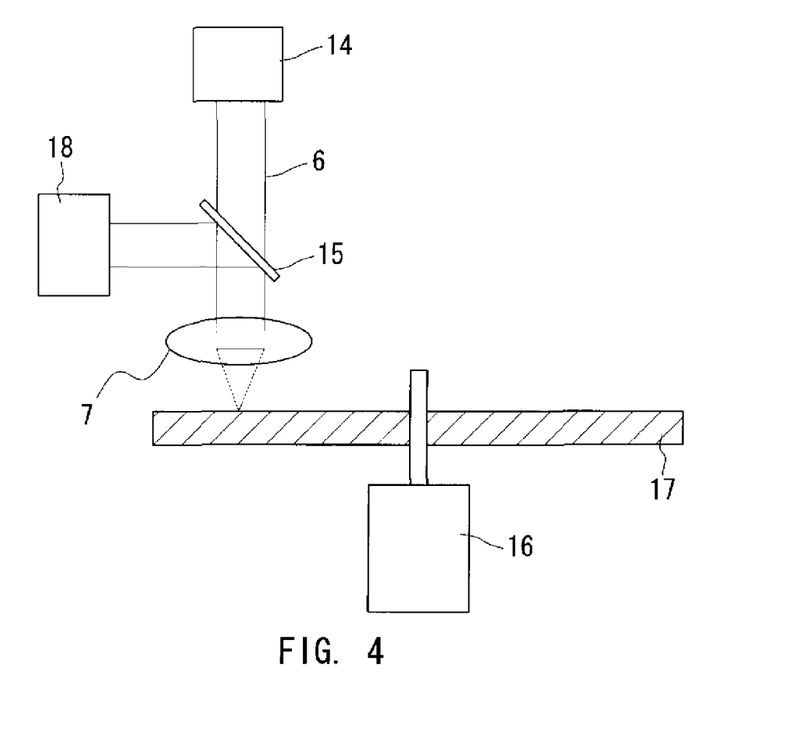
FIG. 4 is a schematic view showing an example of the apparatus for recording and reproducing with respect to an optical information recording medium according to the present invention.

FIG. 4 shows a schematic view of an example of the basic configuration required for a recording and reproducing apparatus that records and reproduces with respect to the optical information recording medium of the present invention. This apparatus includes at least a recording and reproducing unit in which an optical information recording medium 17 is irradiated with an laser beam 6 with a wavelength of 450 nm or shorter and thereby information is recorded thereon or reproduced therefrom, and a photodetector (detection unit) 18 that detects light reflected from the optical information recording medium 17. In this embodiment, the recording and reproducing unit includes a laser diode 14 that emits the laser beam 6 with a wavelength of 450 nm or shorter, a half mirror 15, and an objective lens 7. The laser beam 6 emitted from the laser diode 14 passes through the half mirror 15 and the objective lens 7 to be focused on the optical information recording medium 17 that is being rotated by a motor 16. Information is reproduced by allowing the light reflected from the optical information recording medium 17 to enter the photodetector 18 and thereby detecting signals. The optical information recording medium 17 is a medium of this embodiment shown in FIGS. 1 to 3.

Figure 5:
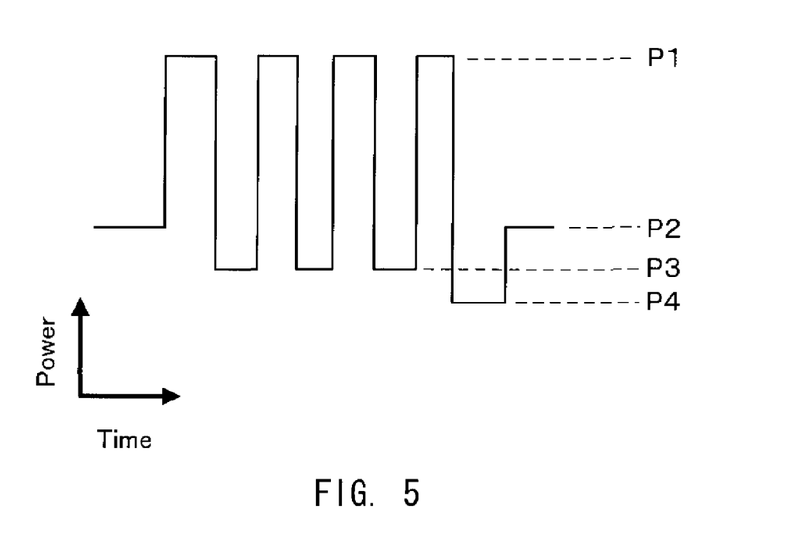
FIG. 5 is a recording pulse waveform that is used for recording and reproducing with respect to an optical information recording medium according to the present invention.

When an information signal is recorded, the intensity of the laser beam 6 is modulated among a plurality of power levels. The modulation of the intensity of the laser beam 6 is carried out advantageously by modulating the current for driving a semiconductor laser, or it also is possible to use a means such as an electro-optic modulator or an acousto-optic modulator. The single rectangular pulse with a peak power P1 can be used with respect to the region where a mark is to be formed. However, particularly when a long mark is to be formed, in order to eliminate excess heat and to make mark widths uniform, a recording pulse train may be used that is formed of a train of a plurality of pulses that have been modulated between the peak power P1 and the bottom power P3 (where P1>P3) as shown in FIG. 5. Furthermore, a cooling interval of a cooling power P4 may be provided after the pulse located at the end. The region where no mark is to be formed is kept constant with a bias power P2 (where P1>P2).

In this connection, depending on each pattern of the length of the mark to be recorded and further the lengths of the spaces before and after the mark, the mark edge positions may not be aligned, which may cause jitter to increase. In the method of recording and reproducing with respect to an optical information recording medium of the present invention, in order to prevent it and to improve the jitter, the position or length of each pulse of the above-mentioned pulse train can be adjusted to be compensated according to need so that the edge positions are aligned in each pattern.

EXAMPLES

Hereinafter, the present invention is described further in detail using examples but is not limited by the following examples.

Example 1

In this example, an optical information recording medium provided with two information layers (a first information layer and a second information layer) was produced. In this example, the first information layer disposed on the transparent substrate side corresponds to the information layer in the optical information recording medium of the present invention.

A protective substrate used herein was formed of polycarbonate resin and had a diameter of about 12 cm, a thickness of about 1.1 mm, a groove pitch of 0.32 μm, and a groove depth of about 20 nm. A 60-nm thick reflective layer formed of $Ag_{98}Pd_1Cu_1$, a 10-nm thick interlayer formed of $(ZnO)_{80}(Cr_2O_3)_5(In_2O_3)_{15}$, a 24-nm thick recording layer formed of $Te_{36}O_{54}Pd_{10}$, and a 20-nm thick protective layer formed of $(ZnO)_{80}(Cr_2O_3)_{20}$ were stacked in this order by the sputtering method to form the second information layer on the surface of the protective substrate where a groove had been formed. A separation layer with a thickness of about 25 μm was formed on the surface of the second information layer to which the same groove pattern as that of the protective substrate was transferred by the 2P method using UV-curable resin. A 10-nm thick reflective layer formed of $Ag_{98}Pd_1Cu_1$, a 10-nm thick interlayer formed of $(ZnO)_{80}(Cr_2O_3)_5(In_2O_3)_{15}$, a 12-nm thick recording layer formed of $Te_{36}O_{54}Pd_{10}$, and a 15-nm thick protective layer formed of one of various materials were stacked in this order by the sputtering method to form the first information layer on the surface of the separation layer. A 75-μm thick transparent substrate was formed on the surface of the first information layer using UV-curable resin.

Discs 1 to 12 were produced as examples of the present invention using ZnO, $SnO_2$, $TeO_2$, $(ZnO)_{80}(Cr_2O_3)_{20}$, $(ZnO)_{80}(Sb_2O_3)_{20}$, $(ZnO)_{80}(Bi_2O_3)_{20}$, $(SnO_2)_{70}(In_2O_3)_{30}$, $(SnO_2)_{70}(Ga_2O_3)_{30}$, $(TeO_2)_{80}(Cr_2O_3)_{20}$, $(ZnO)_{80}(Cr_2O_3)_5(In_2O_3)_{15}$, $(ZnO)_{50}(TeO_2)_{50}$, and $(SnO_2)_{50}(TeO_2)_{50}$, respectively, for the protective layer of each first information layer. Discs 13 to 18 were produced as comparative examples using $(ZnO)_{50}(SiO_2)_{50}$, $(TiO_2)_{50}(Cr_2O_3)_{50}$, $Si_3N_4$, $SiO_2$, $(ZnS)_{50}(SiO_2)_{50}$, and $(ZnS)_{80}(Cr_2O_3)_{20}$, respectively, for the protective layer of each first information layer.

The groove of each disc described above, i.e. the portion selected from the groove and the intergroove that can be seen as a convex from the laser beam incident side, was irradiated with a laser beam with a wavelength of 405 nm using an optical system whose lens numerical aperture was 0.85 while the disc was revolved at a linear speed of 4.9 m/s, and thereby a single signal with a frequency of 16.5 MHz was recorded.

When the signal was recorded, a single pulse with a width of 6 ns at a power level P1 was used and all of P2, P3, P4, and the reproducing power were 0.7 mW.

Under this condition, a signal was recorded once on an unrecorded track and thereby the C/N ratio of the single signal was measured with a spectrum analyzer. It was measured with P1 being changed arbitrarily, and the value that was 1.25 times the power at which the amplitude was lower than the maximum value by 3 dB was determined as a setting power. After the C/N ratio (the C/N ratio before acceleration) was measured at the setting power of each disc, in order to check storage reliability, each disk was maintained under conditions including a temperature of 90° C. and a relative humidity of 80% for 100 hours and then the C/N ratio (the CIN ratio after acceleration) was measured again. The results with respect to the first information layers are indicated in Table 1. Table 1 also indicates the total amount (atom %) of atoms of Cr, Zn, Ga, In, Sn, Sb, Bi, and Te in the protective layer in the case where the total amount of all the atoms other than oxygen atoms contained in the protective layer is taken as 100 atom %.

TABLE 1

| | | C/N ratio | | |
| --- | --- | --- | --- | --- |
| Disc Nos. | Protective layer | Before acceleration | Decrease after acceleration | Total amount of atoms [atom %] |
| 1 | ZnO | ◎ | ○ | 100 |
| 2 | $SnO_2$ | ◎ | ○ | 100 |
| 3 | $TeO_2$ | ○ | ◎ | 100 |
| 4 | $(ZnO)_{80}(Cr_2O_3)_{20}$ | ◎ | ◎ | 100 |
| 5 | $(ZnO)_{80}(Sb_2O_3)_{20}$ | ◎ | ○ | 100 |
| 6 | $(ZnO)_{80}(Bi_2O_3)_{20}$ | ○ | ◎ | 100 |

TABLE 1-continued

| | | | | |
|---|---|---|---|---|
| 7 | $(SnO_2)_{70}(In_2O_3)_{30}$ | ◎ | ○ | 100 |
| 8 | $(SnO_2)_{70}(Ga_2O_3)_{30}$ | ◎ | ○ | 100 |
| 9 | $(TeO_2)_{80}(Cr_2O_3)_{20}$ | ○ | ◎ | 100 |
| 10 | $(ZnO)_{80}(Cr_2O_3)_5(In_2O_3)_{15}$ | ◎ | ◎ | 100 |
| 11 | $(ZnO)_{50}(TeO_2)_{50}$ | ○ | ◎ | 100 |
| 12 | $(SnO_2)_{50}(TeO_2)_{50}$ | ○ | ○ | 100 |
| 13 | $(ZnO)_{50}(SiO_2)_{50}$ | ◎ | x | 50 |
| 14 | $(TiO_2)_{50}(Cr_2O_3)_{50}$ | ○ | Δ | 67 |
| 15 | $Si_3N_4$ | ◎ | Δ | 0 |
| 16 | $SiO_2$ | x | x | 0 |
| 17 | $(ZnS)_{50}(SiO_2)_{50}$ | ◎ | x | 0 |
| 18 | $(ZnS)_{80}(Cr_2O_3)_{20}$ | ○ | x | 33 |

<Meaning of respective symbols>

| Symbol | Before acceleration | Decrease after acceleration |
|---|---|---|
| ◎ | At least 44 dB | Less than 0.5 dB |
| ○ | At least 42 dB but less than 44 dB | At least 0.5 dB but less than 1.0 dB |
| Δ | At least 40 dB but less than 42 dB | At least 1.0 dB but less than 3.0 dB |
| x | Less than 40 dB | At least 3.0 dB |

According to Table 1, in all the discs 1 to 12 of the examples according to the present invention, the C/N ratios were sufficiently high before acceleration and did not decrease much even after acceleration, and thereby they exhibited an excellent storage reliability. On the other hand, the discs 13 to 18 of the comparative examples, which were different in material compositions from those of the present invention, had C/N ratios decreased considerably after acceleration and as a result, it was proved that they did not have a sufficiently high storage reliability.

Similarly, the experiment for comparing protective layer materials was carried out with respect to the case of the second information layer, the case of a single information layer that was formed of the second information layer alone that included a 100-μm thick transparent substrate but did not include the first information layer and the interlayer, or the case where Cr—O, Zn—O, Ga—O, In—O, Sn—O, Sb—O, or Bi—O was used as the material for the recording layer. However, the superiority in storage reliability remained unchanged among the materials and compositions of the respective protective layers described above.

As described above, the optical information recording medium of the present invention allows high signal quality to be obtained in high density recording and has a high storage reliability. Accordingly, it is useful as a medium for storing data that can be digitized, such as image, music, and information.

The specific embodiments or examples described in the section of "DETAILED DESCRIPTION OF THE INVENTION" are intended only to clarify the technical contents of the present invention and the present invention should not be interpreted narrowly as limiting to such specific examples alone. They can be embodied by being modified variously within the spirit of the present invention and the range of patent claims to be described next.

What is claimed is:

1. An optical information recording medium, comprising at least one information layer that is provided on a transparent substrate and that includes a protective layer and a write-once recording layer that are disposed in this order from a side of the transparent substrate from which an optical beam is incident on the optical information recording medium, wherein the recording layer contains at least one selected from the group consisting of Cr—O, Zn—O, Ga—O, In—O, Sn—O, Sb—O, Bi—O, and Te—O, and the protective layer contains Zn—O and Cr—O, and when the total amount of all atoms other than an oxygen atom contained in the protective layer is taken as 100 atom %, the amount of atoms of Zn is 33 atom % to 96 atom % and the amount of atoms of Cr is at least 4 atom % but less than 50 atom %, in the protective layer.

2. The optical information recording medium according to claim 1, wherein the protective layer further contains S, and when the total amount of all atoms other than an oxygen atom contained in the protective layer is taken as 100 atom %, the amount of atoms of S in the protective layer is 2 atom % or lower.

3. The optical information recording medium according to claim 1, wherein the information layer further includes a buffer layer disposed between the protective layer and the recording layer.

4. The optical information recording medium according to claim 1, wherein the recording layer contains Te—O.

5. The optical information recording medium according to claim 4, wherein the recording layer further contains at least either one selected from Pd and Au.

6. The optical information recording medium according to claim 1, further comprising a protective substrate disposed on an opposite side to the transparent substrate with respect to the information layer.

7. The optical information recording medium according to claim 1, wherein the information layer is provided with a groove, and the groove has a pitch of 1 μm or smaller.

8. The optical information recording medium according to claim 1, comprising n information layers including a first information layer to an n-th information layer (where n is an integer of at least 2) on the transparent substrate, wherein at least one information layer selected from the group consisting of the first information layer to the n-th information layer includes the protective layer and the recording layer that are disposed in this order from the side of the transparent substrate.

9. The optical information recording medium according to claim 1, wherein the information layer further includes a reflective layer disposed on a side opposite to the protective layer with respect to the recording layer.

10. The optical information recording medium according to claim 1, wherein the information layer further includes an interlayer disposed on a side opposite to the protective layer with respect to the recording layer.

11. A method of recording and reproducing with respect to an optical information recording medium, wherein an optical information recording medium according to claim 1 is irradiated with an optical beam having a wavelength of 450 nm or shorter and thereby information is recorded thereon or reproduced therefrom.

12. An apparatus for recording and reproducing with respect to an optical information recording medium, comprising at least a recording and reproducing unit in which an optical information recording medium according to claim 1 is irradiated with an optical beam having a wavelength of 450 nm or shorter and thereby information is recorded thereon or reproduced therefrom, and a detection unit that detects light reflected from the optical information recording medium.

* * * * *